United States Patent [19]

Uchida et al.

[11] Patent Number: 5,705,540
[45] Date of Patent: Jan. 6, 1998

[54] INORGANIC FILLER, MANUFACTURING METHOD THEREOF, AND RESIN COMPOSITION CONTAINING AN INORGANIC FILLER

[75] Inventors: Ken Uchida, Tokyo; Yasuyuki Hotta, Funabashi; Shuzi Hayase, Yokohama, all of Japan

[73] Assignee: Kabushiki Kaisha Toshiba, Kawasaki, Japan

[21] Appl. No.: 781,852

[22] Filed: Jan. 10, 1997

Related U.S. Application Data

[63] Continuation of Ser. No. 308,428, Sep. 19, 1994, abandoned.

[30] Foreign Application Priority Data

Sep. 20, 1993 [JP] Japan .................................. 5-232874

[51] Int. Cl.$^6$ .................................................. C08K 9/10
[52] U.S. Cl. ..................... 523/210; 523/212; 523/435; 523/466; 524/428; 524/430; 524/437; 524/443; 524/493; 524/606; 524/609
[58] Field of Search .................................. 523/212, 435, 523/466, 210; 524/606, 609, 430, 428, 443, 437, 493

[56] References Cited

U.S. PATENT DOCUMENTS

5,438,113  8/1995  Shimozawa et al. .................. 525/476

OTHER PUBLICATIONS

S. Sterman and J. G. Marsdent; "How Silane Coupling Agents Improve RP Products" Modern Plastics, Feb. 1967; pp. 91–93, 170–173.

Patent Abstracts of Japan, vol. 17, No. 285 (C–1066), Jun. 2, 1993, JP-A-05 17121, Jan. 26, 1993.

*Primary Examiner*—Karen A. Dean
*Attorney, Agent, or Firm*—Oblon, Spivak, McClelland, Maier & Neustadt, P.C.

[57] ABSTRACT

Disclosed is a resin composition excellent in mechanical and electrical properties. The composition contains an inorganic filler such as fused silica or silicon nitride having the surface covered with a substance resulting from decomposition of a polysilane compound and a base resin such as an epoxy resin or a maleimide resin.

8 Claims, No Drawings

INORGANIC FILLER, MANUFACTURING METHOD THEREOF, AND RESIN COMPOSITION CONTAINING AN INORGANIC FILLER

This application is a Continuation of application Ser. No. 08/308,428, filed on Sep. 19, 1994, now abandoned.

BACKGROUND OF THE INVENTION

1. Field of the Invention

The present invention relates to an inorganic filler, a method of manufacturing the inorganic filler and a resin composition containing the inorganic filler.

2. Description of the Related Art

In a resin composition containing an inorganic filler, which is widely used for the manufacture of molded articles, the surface treatment of the inorganic filler is very important because the mechanical properties, electrical properties, resistance to water, etc. of the molded article are greatly dependent on the surface treatment of the inorganic filler. In many cases, a coupling agent of silane series, titanate series, aluminum series, etc. is used for the surface treatment of the inorganic filler such as silica or alumina. The surface treatment of the inorganic filler using such a coupling agent is carried out, as exemplified below:

(a) An inorganic filler is dispersed in water or an organic solvent to prepare a slurry, followed by adding a solution of the coupling agent to the slurry. The resultant system is stirred and, then, left to stand to permit the inorganic filler to be precipitated. Further, the precipitate is dried to finish the surface treatment of the inorganic filler.

(b) A solution of a coupling agent is sprayed with air or nitrogen gas into a blender housing an inorganic filler while stirring the inorganic filler, followed by drying the inorganic filler to finish the surface treatment.

(c) A resin and an inorganic filler are put in a mixer, and a solution of a coupling agent is dripped into the mixer while stirring the mixture of the resin and the organic filler. This method is called an integral blending method.

The conventional surface treating methods exemplified above certainly permit producing a reasonable effect because a resin composition containing an inorganic filler subjected to any of the surface treatments noted above exhibits improvements in compatibility of the inorganic filler with the resin matrix and in mechanical and electrical properties of the molded article, compared with a resin composition containing an inorganic filler not subjected to the surface treatment. In any of the conventional methods exemplified above, however, the filler particles tend to be aggregated. Also, the chemical reaction does not proceed sufficiently between the coupling agent and the surface of the inorganic filler, making it necessary to use an unduly large amount of the coupling agent in order to allow the surface of the inorganic filler to be covered sufficiently with the reaction product. In this case, the extra coupling agent tends to enter the resin matrix to perform the function of a plasticizer, with the result that detrimental effects are given to the mechanical properties of the molded article. Because of these problems, a resin composition containing an inorganic filler treated with a coupling agent fails to produce satisfactory mechanical and electrical properties.

Incidentally, a dehydrating condensation reaction is carried out between a coupling agent and the surface of an inorganic filler, as exemplified below.

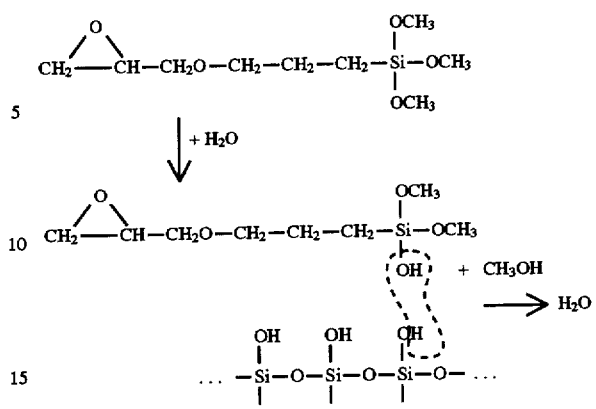

As described above, a dehydrating condensation reaction is not sufficiently carried out in a liquid phase.

SUMMARY OF THE INVENTION

An object of the present invention is to provide an inorganic filler compatible with a resin, and a resin composition containing such an inorganic filler and a base resin, the composition exhibiting excellent mechanical and electrical properties.

The inorganic filler of the present invention comprises a filler body and a surface layer made of a substance resulting from decomposition of a polysilane compound. The substance is chemically bonded to at least a part of the surface of the filler body.

The resin composition of the present invention comprises a base resin and an inorganic filler including a filler body and a substance resulting from decomposition of a polysilane compound that is chemically bonded to the surface of the filler body. The particular resin composition of the present invention exhibits excellent mechanical and electrical properties.

DETAILED DESCRIPTION OF THE PREFERRED EMBODIMENTS

The inorganic filler of the present invention comprises an inorganic filler body and a surface layer made of a substance resulting from decomposition of a polysilane compound.

The filler body is not particularly restricted as far as the filler body is compatible with the base resin, and includes, for example, a fused silica, crystalline silica, alumina, silicon nitride, and aluminum nitride.

The polysilane compound used in the present invention is not particularly restricted as far as the compound has a Si—Si main chain and at least two silicon atoms in a molecule, and includes, for example, a polymer having a repeating unit represented by general formula (I) given below:

where $R_1$ and $R_2$, which may be the same or different, are hydrogen, an alkyl group having 1 to 24 carbon atoms, an aryl group having 6 to 24 carbon atoms, or an aralkyl group having 7 to 24 carbon atoms. Each of these alkyl, aryl and aralkyl groups may have a substituent selected from the group consisting of hydroxyl group, carboxyl group, cyano group, nitro group, amino group, vinyl group, acetyl group, and a hydrophilic group containing ether bond, thioether bond, ester bond, amido bond, carbamate bond, carbonate bond, imido bond, or epoxy group.

The polysilane compound used in the present invention should desirably have an average molecular weight of 100 to 100,000. If the average molecular weight of the polysilane compound deviates from the above range the polysilane will fail to exhibit an effect as a surface treatment agent.

In the present invention, an inorganic filler body and a polysilane compound are mixed, and the mixture is irradiated with light or heated while being stirred so as to cleave the Si—Si main chain of the polysilane compound and, thus, to generate an active radical. The resultant active radical forms a chemical bond with the surface of the inorganic filler body, with the result that the surface of the filler body is covered with the substance resulting from decomposition of the polysilane compound. A reaction mechanism involving silylene formation is also considered to take place in the method of the present invention. These reaction mechanisms are exemplified by the following formula. These reactions are carried out through the simple procedure as described above.

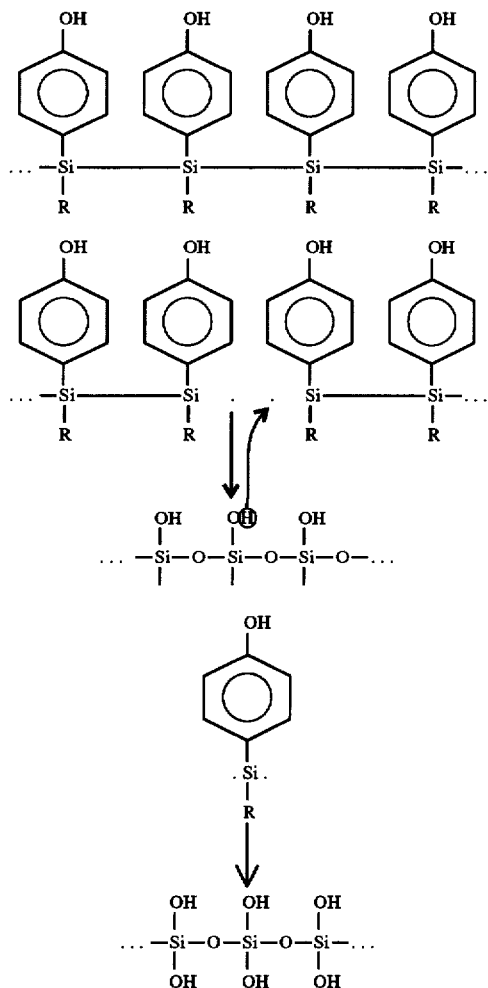

It suffices to use the polysilane compound in an amount required for covering the surface of the inorganic filler body. Naturally, the specific amount of the polysilane compound depends on the entire surface area of the filler body. In general, it suffices to use the polysilane compound in an amount of at most 1% by weight based on the amount of the inorganic filler body. However, the polysilane compound, even if added in an excessive amount, does not give a noticeable detrimental effect on the properties of the resin composition comprising the inorganic filler treated with the polysilane compound. In practice, it is acceptable to use the polysilane compound in an amount of up to 10% by weight based on the amount of the inorganic filler body.

Aggregation of the filler particles, which accompanies the conventional technique utilizing a coupling agent, can be eliminated in the present invention. Further, the substance resulting from decomposition of the polysilane compound is highly reactive, with the result that the surface of the inorganic filler body can be sufficiently covered with the decomposed substance.

Where a suitable substituent is introduced into the side chain of the polysilane compound used for treating the inorganic filler body, various properties of the resultant resin composition containing the inorganic filler can be further improved. For example, where a functional group having a reactivity with the resin or an organic group which permits improving the compatibility with the resin is introduced into the side chain of the polysilane compound, the filler particles treated with the polysilane compound can be uniformly dispersed in the resin when they are molded. In addition, the inorganic fillers are strongly adhered to the resin. It follows that the molded resin composition exhibits satisfactory mechanical properties. Further, no clearance is formed between the inorganic filler and the resin, leading to a high resistance to moisture. In addition, the molded resin composition exhibits satisfactory electrical properties after moisture absorption. On the other hand, where $R_1$ and $R_2$ representing the side chains of the polysilane compound are hydrophobic groups such as a non-substituted alkyl, non-substituted aryl or non-substituted aralkyl group, the resultant resin composition is enabled to exhibit a low moisture absorption rate, leading to improved electrical properties.

A thermosetting resin or a thermoplastic resin can be used in the present invention as a base resin. The thermoplastic resin used in the present invention includes, for example, polyvinyl chloride; polyolefins such as polyethylene and polypropylene; and so-called engineering plastic such as polycarbonate and nylon. On the other hand, the thermosetting resin used in the present invention is not particularly restricted as far as the resin is three dimensionally cross-linked upon heating to provide a cured material. Preferably, an epoxy-based or maleimide-based thermosetting resin can be used in the present invention.

The epoxy resin used in the present invention should have at least two epoxy groups in a molecule and includes, for example, phenol-novolak type epoxy resin, cresol-novolak type epoxy resin, naphthol-novolak type epoxy resin, bisphenol A-novolak type epoxy resin, glycidyl ether of bisphenol A, epoxide of tri(hydroxyphenyl)alkane, epoxide of tetra(hydroxyphenyl)alkane, bishydroxy bisphenyl type epoxy resin and brominated epoxy resin. Where the inorganic filler used has on the surface a functional group derived from the polysilane compound such as an amino group, epoxy group, imido group, thioether group, hydroxyl group or carboxyl group, the reaction between the epoxy resin and the functional group noted above can be performed satisfactorily.

The maleimide resin used in the present invention should have at least two imido groups in a molecule and includes, for example, N,N'-substituted bismaleimide compound represented by general formula (II) given below:

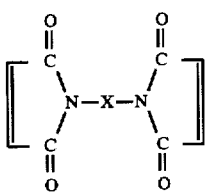

[III]

where X represents a divalent hydrocarbon group such as an alkylene, cyloalkylene, mono-cyclic or polycyclic arylene group.

The maleimide resin used in the present invention also includes poly(phenylmethylene) polymaleimide represented by general formula (III) given below:

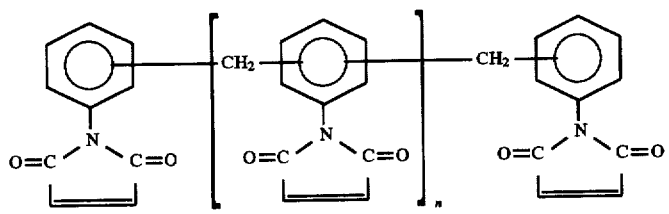

[III]

where n is an integer of 1 to 6.

To be more specific, the maleimide resin used in the present invention includes, for example, N,N'-phenylene bismaleimide, N,N'-hexamethylene bismaleimide, N,N'-diphenylmethane bismaleimide, N,N'-oxy-di-p-phenylene bismaleimide, N,N'-4,4'-benzophenone bismaleimide, N,N'-p-diphenylsulfone bismaleimide, and poly (phenylmethylene)polymaleimide.

Where the inorganic filler used has on the surface a functional group derived from the polysilane compound such as a vinyl group, hydroxyl group, imido group, or epoxy group, the reaction between the maleimide resin and the functional group noted above can be performed satisfactorily.

In the present invention, the epoxy resin and the maleimide resin can be used singly or in combination. It is also possible to add a curing agent to these resins. The curing agent used in the present invention, which is not particularly restricted, includes, for example, a phenolic resin, an organic anhydride, and amines. It is also possible to add a curing catalyst for accelerating the curing reaction of the resin. The curing catalyst used in the present invention, which is not particularly restricted, includes, for example, imidazoles such as 2-methyl imidazole and 2-heptadecyl imidazole; diazabicyclo alkenes such as diazabicyclo undecene and salts thereof; organic phosphines such as triphenyl phosphine; and other organometallic compounds.

It is also possible for the resin composition of the present invention to contain additional components including, for example, flame retardants such as antimony trioxide; mold release agents such as natural waxes, synthetic waxes, linear fatty acids and metal salts thereof, acid amides, esters and paraffins; pigments such as carbon black and titanium dioxide; stress-reducing agents such as silicone oil, silicone rubber, various plastic powders, various engineering plastic powders, ABS resin powder and MBS resin powder.

The mixing ratio of the inorganic filler to the base resin is not particularly restricted in the resin composition of the present invention. In general, the inorganic filler should be added in an amount of 1 to 90 vol % of the resin amount depending on the use of the resin composition.

The resin composition of the present invention can be prepared by, for example, sufficiently mixing all the starting materials including the inorganic filler having the surface chemically modified with a substance resulting from decomposition of a polysilane compound with, for example, a Henschel mixer, followed by, for example, a melt treatment with hot rolls or a melt mixing treatment with a biaxial extruder.

Alternatively, an inorganic filler body, a polysilane compound and at least a part of the thermosetting resin component are heated together to melt and sufficiently mix these materials. During the heating, reaction is carried out between the surface of the inorganic filler body and the polysilane compound. During the reaction, the reaction mixture may be irradiated with light, if necessary. Then, the reaction mixture is cooled and pulverized so as to prepare a precursor resin composition. Further, the precursor resin composition is added to the remaining components of the desired resin composition, and the resultant mixture is heated to melt and achieve a sufficient mixing so as to obtain a desired resin composition.

Further, a desired resin composition can also be prepared by heating together an inorganic filler body, a polysilane compound, and the thermoplastic resin component to melt and mix sufficiently these materials. During the heating, reaction is carried out between the surface of the inorganic filler body and the polysilane compound so as to provide a desired resin composition. The reaction system may be irradiated with light, if necessary, during the reaction. Further, the resin composition of the present invention can be widely used for general purposes of a composite material comprising a resin and an inorganic filler. For example, the resin composition can be used for providing encapsulant materials of electric and electronic parts, machinery parts such as paints, gears and bearings, and various housing materials.

Let us describe more in detail the present invention with reference to Examples.

[Surface Treatment of Inorganic Filler Body]

Surface-treated inorganic fillers A to K were prepared as follows:

(Inorganic Filler A)

A universal mixer having a UV lamp mounted therein was charged with 1,000 g of fused silica (inorganic filler body) having an average particle diameter of 20 μm and 5 g of polysilane (1) represented by chemical formula given below, and having an average molecular weight of about 10,000. Then, the pressure within the universal mixer was reduced, and the mixture of the fused silica and polysilane (1) was kept stirred for 5 hours while irradiating the mixture with UV to obtain a surface treated inorganic filler A.

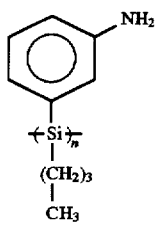

(Inorganic Filler B)

A universal mixer having a UV lamp mounted therein was charged with 1,000 g of fused silica having an average particle diameter of 20 μm and 5 g of polysilane (2) represented by chemical formula given below, and having an average molecular weight of about 10,000. Then, the pressure within the universal mixer was reduced, and the mixture of the fused silica and polysilane (2) was kept stirred for 5 hours while irradiating the mixture with UV to obtain a surface treated inorganic filler B.

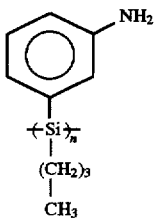

(Inorganic Filler C)

A universal mixer was charged with 1,000 g of fused silica having an average particle diameter of 20 μm and 5 g of polysilane (1) having an average molecular weight of about 10,000. Then, the pressure within the universal mixer was reduced, and the mixture of the fused silica and polysilane (1) was heated to 200° C. and kept stirred for 5 hours to obtain a surface treated inorganic filler C.

(Inorganic Filler D)

A universal mixer having a UV lamp mounted therein was charged with 1,500 g of silicon nitride (inorganic filler body) having an average particle diameter of 25 μm and 5 g of polysilane (1) having an average molecular weight of about 10,000. Then, the pressure within the universal mixer was reduced, and the mixture of the silicon nitride and polysilane (1) was kept stirred for 5 hours while irradiating the mixture with UV to obtain a surface treated inorganic filler D.

(Inorganic Filler E)

A universal mixer having a UV lamp mounted therein was charged with 1,000 g of fused silica having an average particle diameter of 20 μm and 5 g of polysilane (3) represented by chemical formula given below, and having an average molecular weight of about 10,000. Then, the pressure within the universal mixer was reduced, and the mixture of the fused silica and polysilane (3) was kept stirred for 5 hours while irradiating the mixture with UV to obtain a surface treated inorganic filler E.

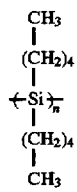

(Inorganic Filler F)

A universal mixer having a UV lamp mounted therein was charged with 1,000 g of fused silica having an average particle diameter of 20 μm and 5 g of polysilane (1) having an average molecular weight of about 5,000. Then, the pressure within the universal mixer was reduced, and the mixture of the fused silica and polysilane (1) was kept stirred for 5 hours while irradiating the mixture with UV to obtain a surface treated inorganic filler F.

(Inorganic Filler G)

A universal mixer having a UV lamp mounted therein was charged with 1,000 g of fused silica having an average particle diameter of 20 μm and 5 g of polysilane (1) having an average molecular weight of about 50,000. Then, the pressure within the universal mixer was reduced, and the mixture of the fused silica and polysilane (1) was kept stirred for 5 hours while irradiating the mixture with UV to obtain a surface treated inorganic filler G.

(Inorganic Filler H)

A universal mixer having a UV lamp mounted therein was charged with 1,000 g of fused silica having an average particle diameter of 20 μm and 10 g of polysilane (1) having an average molecular weight of about 10,000. Then, the pressure within the universal mixer was reduced, and the mixture of the fused silica and polysilane (1) was kept stirred for 5 hours while irradiating the mixture with UV to obtain a surface treated inorganic filler H.

(Inorganic Filler I)

A solution containing 0.5% by weight of a silane coupling agent was prepared by dissolving A-187 (trade name of γ-glycidoxypropyltrimethoxysilane manufactured by Nippon Unicar Co. Ltd.) used as the silane coupling agent in a 50 wt % methanol aqueous solution. Then, a fused silica having an average particle diameter of 20 μm was dispersed in the solution of the silane coupling agent, followed by filtering the dispersion and subsequently drying the filtrate at 130° C. and, then, pulverizing the dry filtrate to obtain a surface treated inorganic filler I.

(Inorganic Filler J)

A solution containing 0.5% by weight of a silane coupling agent was prepared by dissolving A-1100 (trade name of γ-(2-aminoethyl)aminopropyltrimethoxysilane manufactured by Nippon Unicar Co. Ltd.) used as the silane coupling agent in a 50 wt % methanol aqueous solution. Then, a fused silica having an average particle diameter of 20 μm was dispersed in the solution of the silane coupling agent, followed by filtering the dispersion and subsequently drying the filtrate at 130° C. and, then, pulverizing the dry filtrate to obtain a surface treated inorganic filler J.

(Inorganic Filler K)

Hexamethyldisilazane was dissolved in toluene to prepare a solution containing 0.5% by weight of hexamethyldisilazane. Then, a fused silica having an average particle diameter of 20 μm was dispersed in the solution, followed by filtering the dispersion and subsequently drying the filtrate at 130° C. and, then, pulverizing the dry filtrate to obtain a surface treated inorganic filler K.

EXAMPLES 1–9 AND COMPARATIVE EXAMPLES 1–3

Resin compositions for Examples 1–9 and Comparative Examples 1–3 were prepared by using the surface treated inorganic fillers A to K described above. Specifically, the starting materials shown in Table 1 were mixed in a Henschel mixer, followed by kneading the mixture by using hot rolls at 60° to 130° C., followed by cooling and, then, pulverizing the kneaded mixture to obtain a desired resin composition. The amounts of the starting materials shown in Table 1 denote parts by weight.

The starting materials shown in Table 1 are:

Epoxy resin A: ESCN195XL, which is a trade name of o-cresol novolak epoxy resin manufactured by Sumitomo Chemical Co., Ltd. (epoxy equivalent of 197).

Epoxy resin B: AER-755, which is a trade name of a bisphenol A type brominated epoxy resin manufactured by Asahi Chemical Industry Co. Ltd. (epoxy equivalent of 460).

Phenolic resin: BRG-557, which is a trade name of a phenol novolak resin curing agent manufactured by Showa Kobunshi K.K. (hydroxyl equivalent of 104).

Maleimide resin: diphenyl-N,N'-bismaleimide

Curing accelerator: C17Z, which is a trade name of 2-heptadecylimidazole manufactured by Shikoku Kasei K.K.

Mold release agent: carnauba wax

Pigment: carbon black

Flame retardant: antimony trioxide

EXAMPLE 10

Starting materials consisting of 52 g of epoxy resin A, 52 g of phenolic resin, 2.7 g of polysilane (1), and 500 g of fused silica were mixed in a mixer, followed by kneading the mixture for 20 minutes with hot rolls heated to 160° C. The kneaded mixture was cooled and, then, pulverized to obtain a precursor resin composition X. Further, the resin composition X and the remaining components of the desired resin composition, i.e., epoxy resin A, epoxy resin B, curing accelerator and mold release agent, were mixed in the mixing ratio shown in Table 1. The resultant mixture was kneaded by melting and, then, pelletized to obtain a resin composition. Heat and shearing force are generated when a mixture consisting of a part of the resin component, silica and the polysilane compound is kneaded by hot rolls. This Example is intended to utilize the particular heat and shearing force for bringing about reaction between silica and the polysilane compound.

For evaluating the resin composition, test pieces were prepared for each of the Examples and Comparative Examples by transfer molding at 175° C. for 3 minutes, followed by after-curing treatment at 200° C. for 8 hours for Example 5 or at 180° C. for 8 hours for the other Examples and Comparative Examples.

These test pieces were used for measuring the thermal expansion coefficient, flexural strength (mechanical property), moisture absorption (resistance to moisture) and volume resistivity after moisture absorption (electrical property). Further, dispersion capability of the filler particles was also measured by visual observation. Table 2 shows the result.

TABLE 1

| | Examples | | | | | | | | | | Comparative Examples | | |
|---|---|---|---|---|---|---|---|---|---|---|---|---|---|
| | 1 | 2 | 3 | 4 | 5 | 6 | 7 | 8 | 9 | 10 | 1 | 2 | 3 |
| Epoxy resin A | 13.6 | 13.6 | 13.6 | 13.6 | — | 13.6 | 13.6 | 13.6 | 13.6 | 5.8 | 13.6 | 13.6 | 13.6 |
| Epoxy resin B | 3.0 | 3.0 | 3.0 | 3.0 | 3.0 | 3.0 | 3.0 | 3.0 | 3.0 | 3.0 | 3.0 | 3.0 | 3.0 |
| Phenolic resin | 7.8 | 7.8 | 7.8 | 7.8 | 8.1 | 7.8 | 7.8 | 7.8 | 7.8 | — | 7.8 | 7.8 | 7.8 |
| Maleimide resin | — | — | — | — | 16.3 | — | — | — | — | — | — | — | — |
| Curing accelerator | 0.2 | 0.2 | 0.2 | 0.2 | 0.2 | 0.2 | 0.2 | 0.2 | 0.2 | 0.2 | 0.2 | 0.2 | 0.2 |
| Mold release agent | 0.4 | 0.4 | 0.4 | 0.4 | 0.4 | 0.4 | 0.4 | 0.4 | 0.4 | 0.4 | 0.4 | 0.4 | 0.4 |
| Filler A | 75.0 | — | — | — | 75.0 | — | — | — | — | — | — | — | — |
| Filler B | — | 75.0 | — | — | — | — | — | — | — | — | — | — | — |
| Filler C | — | — | 75.0 | — | — | — | — | — | — | — | — | — | — |
| Filler D | — | — | — | 75.0 | — | — | — | — | — | — | — | — | — |
| Filler E | — | — | — | — | — | 75.0 | — | — | — | — | — | — | — |
| Filler F | — | — | — | — | — | — | 75.0 | — | — | — | — | — | — |
| Filler G | — | — | — | — | — | — | — | 75.0 | — | — | — | — | — |
| Filler H | — | — | — | — | — | — | — | — | 75.0 | — | — | — | — |
| Filler I | — | — | — | — | — | — | — | — | — | — | 75.0 | — | — |
| Filler J | — | — | — | — | — | — | — | — | — | — | — | 75.0 | — |
| Filler K | — | — | — | — | — | — | — | — | — | — | — | — | 75.0 |
| Resin composition X | — | — | — | — | — | — | — | — | — | 91.0 | — | — | — |

TABLE 2

|  | Examples | | | | | | | | | | Comparative Examples | | |
| --- | --- | --- | --- | --- | --- | --- | --- | --- | --- | --- | --- | --- | --- |
|  | 1 | 2 | 3 | 4 | 5 | 6 | 7 | 8 | 9 | 10 | 1 | 2 | 3 |
| Thermal Expansion Coefficient ($10^{-5}$ 1/°C.) | 1.7 | 1.7 | 1.7 | 1.5 | 1.4 | 1.7 | 1.7 | 1.7 | 1.7 | 1.7 | 1.9 | 1.9 | 2.0 |
| Flexural strength ($kg/mm^2$) | 19.0 | 19.5 | 18.5 | 18.5 | 19.5 | 17.0 | 19.1 | 19.2 | 18.8 | 18.8 | 17.0 | 17.0 | 15.0 |
| Moisture Absorption[1] (wt %) | 0.60 | 0.65 | 0.61 | 0.68 | 0.45 | 0.55 | 0.61 | 0.61 | 0.59 | 0.61 | 0.70 | 0.72 | 0.70 |
| Volume resistivity[2] ($10^{13}$ Ω cm) | 1.0 | 1.0 | 0.9 | 0.9 | 0.8 | 1.5 | 1.0 | 1.0 | 1.0 | 1.0 | 0.5 | 0.5 | 0.7 |
| Dispersion of inorganic particles | good | good | good | good | good | good | good | good | good | good | Aggregation | Aggregation | Aggregation |

[1] Left to stand for 20 hours under a saturated steam of 2 atms.
[2] Measured at 150° C. after the test piece was left to stand for 20 hours under a saturated steam of 2 atoms.

As apparent from Table 2, the resin compositions for Examples 1 to 10 were found to be superior to the resin compositions for Comparative Examples 1–3 in any of the dispersion capability of the filler particles, mechanical property, resistance to moisture and electrical property.

EXAMPLES 11, 12 AND COMPARATIVE EXAMPLE 4

The surface treated inorganic filler B was mixed with polyamide resin, i.e., poly-ε-caprolactam having a melting point of 225° C., such that the resultant resin composition contained 17% by volume of fused silica. The mixture was kneaded in a vented extruder at 240° to 260° C. to pelletize the kneaded mixture. Then, a test piece for Example 11 was prepared by injection molding of the resultant pellets at a cylinder temperature of 270° C., an injection pressure of 600 kg/cm² and a mold temperature of 90° C.

In addition, polyamide resin, fused silica having an average particle diameter of 20 μm and polysilane (2) were mixed such that the ratio of each component was made equal to that in Example 11. The mixture was kneaded in a vented extruder at 240° to 260° C. to pelletize the kneaded mixture. Then, a test piece for Example 12 was prepared by the same method as in Example 11.

For comparison, another test piece (Comparative Example 4) was also prepared in exactly the same manner except that the surface treated inorganic filler K was used in place of inorganic filler B used for preparing the test piece for Example 11.

These test pieces were used for measuring the flexural modulus and flexural strength under dry and humid conditions. The dispersion capability of the filler particles was also measured by visual observation. Table 3 shows the results.

TABLE 3

|  |  | Example 11 | Example 12 | Comparative Example 4 |
| --- | --- | --- | --- | --- |
| Flexural strength ($kg/mm^2$) | Dry | 9.0 | 9.2 | 8.0 |
|  | Humid | 8.0 | 8.1 | 6.0 |
| Flexural modulus ($kg/mm^2$) | Dry | 700 | 710 | 620 |
|  | Humid | 600 | 610 | 450 |
| Dispersion of inorganic particles |  | good | good | Aggregation |

As apparent from Table 3, the resin compositions for Examples 11 and 12 were found to be superior to the composition for Comparative Example 4 in any of the dispersion capability of the filler particles, mechanical properties and resistance to water.

What is claimed is:

1. A resin composition, comprising:
   an inorganic filler; and
   a base resin; wherein
   said filler is chemically modified with a polysilane compound having an Si—Si backbone; and wherein said polysilane compound is bound directly to said filler.

2. The resin composition of claim 1, wherein said polysilane compound further comprises hydrophobic groups bonded to the Si—Si backbone of said polysilane compound, wherein said hydrophobic groups are selected from the group consisting of an alkyl group, an aryl group and an aralkyl group.

3. The resin composition of claim 1, wherein said base resin comprises an epoxy resin, said epoxy resin being cured by a phenolic resin, and wherein
   said polysilane compound further comprises a functional group selected from the group consisting of an amino group, an epoxy group, an imido group, a thioether group, a hydroxyl group and a carboxyl group.

4. The resin composition of claim 1, wherein said base resin is a maleimide resin, and wherein
   said polysilane compound comprises a functional group selected from the group consisting of a vinyl group, a hydroxyl group, an imido group and an epoxy group.

5. The resin composition of claim 1, wherein said inorganic filler is selected from the group consisting of fused silica, crystalline silica, alumina, silicon nitride, and aluminum nitride.

6. The resin composition according to claim 1, wherein said inorganic filler is contained in an amount of 1 to 90 vol % based on the amount of the base resin.

7. The resin composition according to claim 1, wherein said base resin is a thermosetting resin.

8. The resin composition according to claim 1, wherein said base resin is a thermoplastic resin.

* * * * *